United States Patent
Tseng

[11] Patent Number: 5,691,534
[45] Date of Patent: Nov. 25, 1997

[54] DIGITAL SIGNAL OUPUT DEVICE HAVING A TRANSPARENT GEAR WHEEL

[76] Inventor: Hsin-Te Tseng, 4F, No. 19, Shih-Chien St., Pei-Tou, Taipei, Taiwan

[21] Appl. No.: 641,725

[22] Filed: May 2, 1996

[51] Int. Cl.$^6$ .................................................. G01D 5/34
[52] U.S. Cl. .............................. 250/231.14; 250/231.18; 250/568
[58] Field of Search ................... 280/231.14, 231.15, 280/231.16, 231.18, 237 G, 237 R, 568, 570; 341/13, 14, 2, 10

[56] References Cited

U.S. PATENT DOCUMENTS 3,780,267 12/1973 Hagelbarger et al. .................. 250/570
5,243,187 9/1993 Hettlage ............................. 250/231.16

*Primary Examiner*—Que Le
*Attorney, Agent, or Firm*—Morton J. Rosenberg; David I. Klein

[57] ABSTRACT

A digital signal output device including a revolving shaft, a transparent gear wheel fixedly mounted around the revolving shaft and turned by it, the transparent gear wheel having a plurality of teeth alternatively spaced by gaps around the periphery and an annular sloping wall at one side around the center, and a plurality of photoelectric inductors spaced from the periphery of the transparent gear wheel and arranged in parallel, wherein when the transparent gear wheel is turned by the revolving shaft, the light of the light source is projected onto the sloping wall of the transparent gear wheel and reflected radially through the teeth and/or gaps of the transparent gear wheel onto the photoelectric inductors, causing the photoelectric inductors to be or not to be triggered, and therefore the amplification circuit which is connected to the output ends of the photoelectric inductors is driven to provide a digital output signal corresponding to the revolving direction and amount of movement of the revolving shaft.

4 Claims, 6 Drawing Sheets

5,691,534

DIGITAL SIGNAL OUPUT DEVICE HAVING A TRANSPARENT GEAR WHEEL

BACKGROUND OF THE INVENTION

The present invention relates to a digital signal output device which uses photoelectric elements to detect the moving direction and amount of movement of a revolving shaft and, which can be used in a monitor for horizontal or vertical synchronizing control, or in an audio equipment for volume or base control.

FIG. 1 shows the structure of a regular variable potential device. This variable potential device is comprised of a carbon diaphragm 10, a carbon brush 11 disposed in contact with the carbon diaphragm 10, output terminals 12, etc. When the carbon brush 11 is rotated relative to the carbon diaphragm 10, the output terminals 12 are caused to change their impedance, and therefore a digital signal output can be obtained from an amplification circuit which is connected to the output ends of the output terminals 12. This structure of variable potential device is not durable in use. Because the carbon brush is turned to rub against the carbon diaphragm, the carbon brush and the carbon diaphragm wear quickly. In order to keep the carbon diaphragm and the carbon brush in good contact with each other, the size of the variable potential device cannot be reduced to the desired dimension, and the total output number of signals per run is limited.

SUMMARY OF THE INVENTION

The present invention has been accomplished to provide a digital signal output device which eliminates the aforesaid drawbacks. According to the present invention, the digital signal output device comprises a revolving shaft, a transparent gear wheel fixedly mounted around the revolving shaft and turned by it, the transparent gear wheel having a plurality of teeth alternatively spaced by gaps around the periphery and an annular sloping wall at one side around the center, and a plurality of photoelectric inductors spaced from the periphery of the transparent gear wheel and arranged in parallel, wherein when the transparent gear wheel is turned by the revolving shaft, the light of the light source is projected onto the sloping wall of the transparent gear wheel and reflected radially through the teeth and/or gaps of the transparent gear wheel onto the photoelectric inductors, causing the photoelectric inductors to be or not to be triggered, and therefore the amplification circuit which is connected to the output ends of the photoelectric inductors is driven to provide a digital output signal corresponding to the revolving direction and amount of movement of the revolving shaft. Furthermore, the revolving shaft can be coupled to a miniature electric rotary device and installed in a monitor for vertical or horizontal synchronizing control, or in an audio equipment for volume or base control.

DETAILED DESCRIPTION OF THE PREFERRED EMBODIMENT

Figure 1:
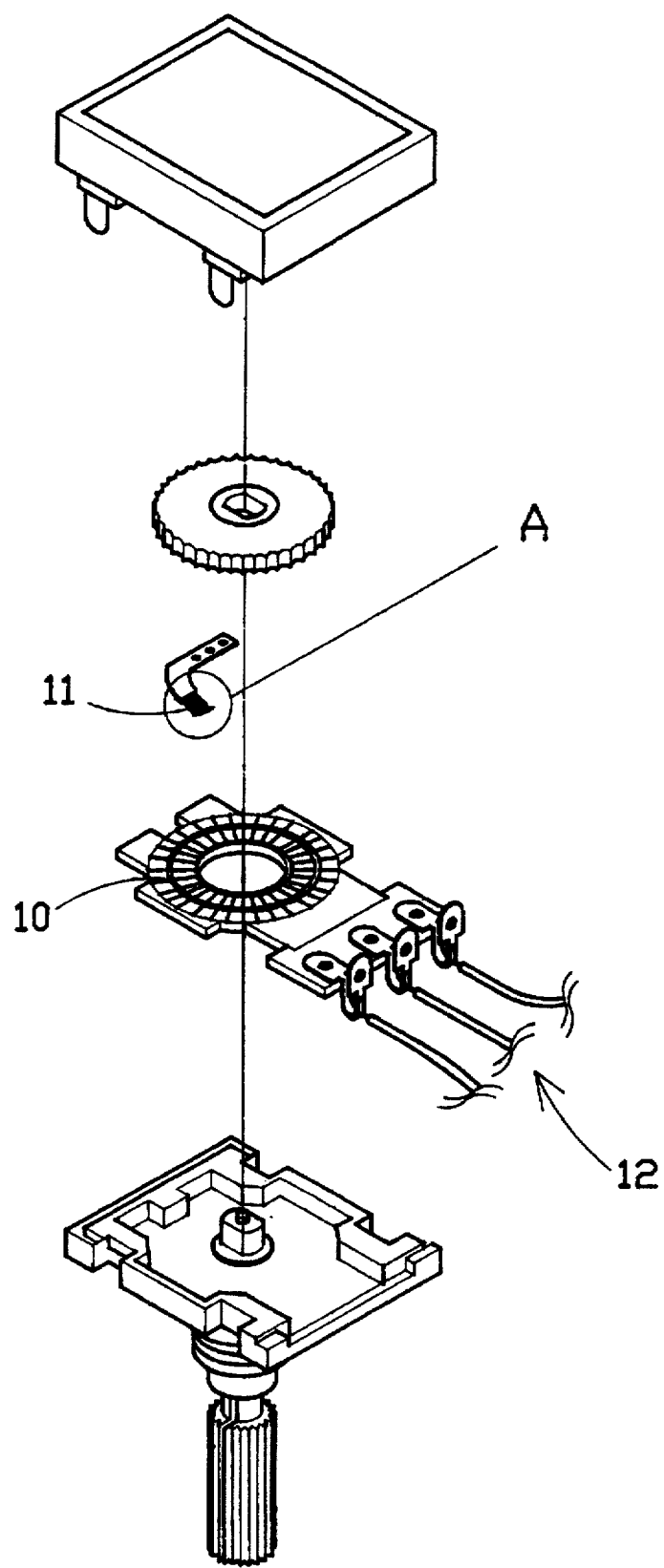
FIGS. 1 and 1A are exploded views of a variable potential device according to the prior art.
Figure 1A:
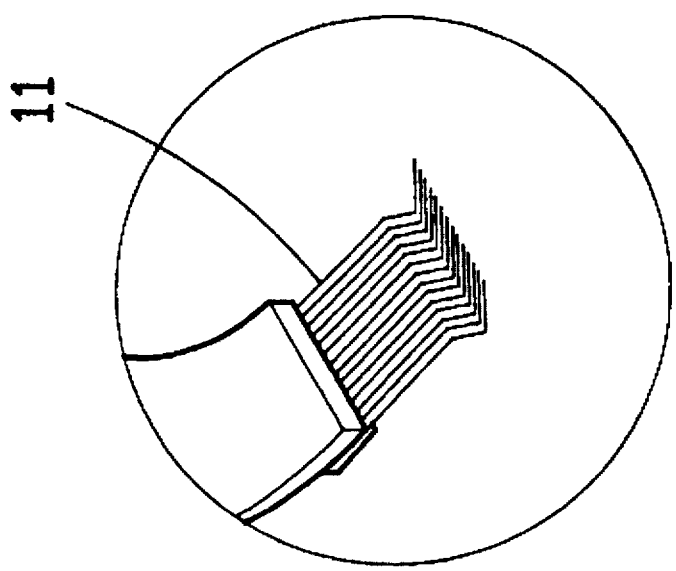
Figure 2:
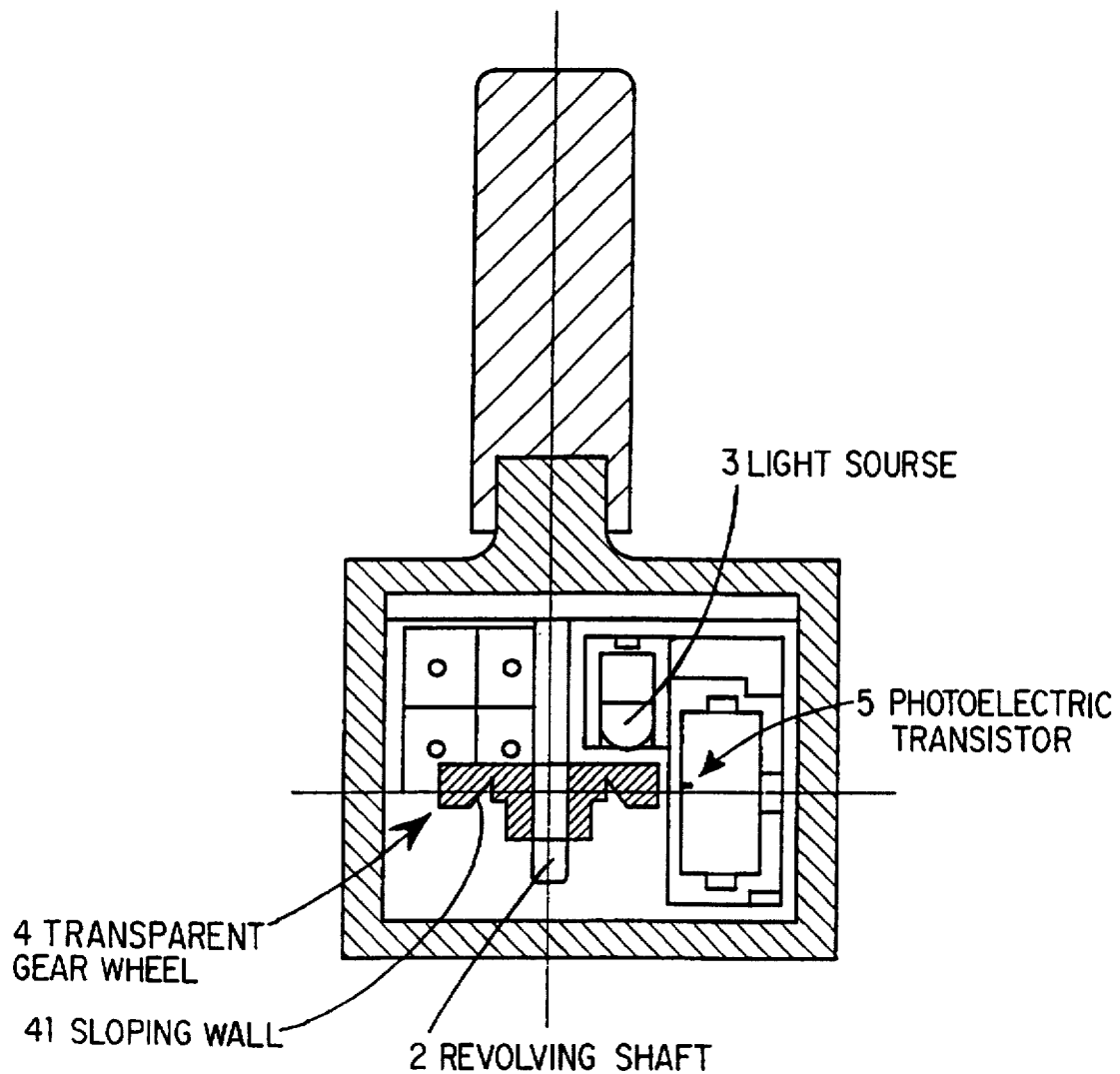
FIG. 2 is a top view in section of a digital signal output device according to the present invention.
Figure 3:
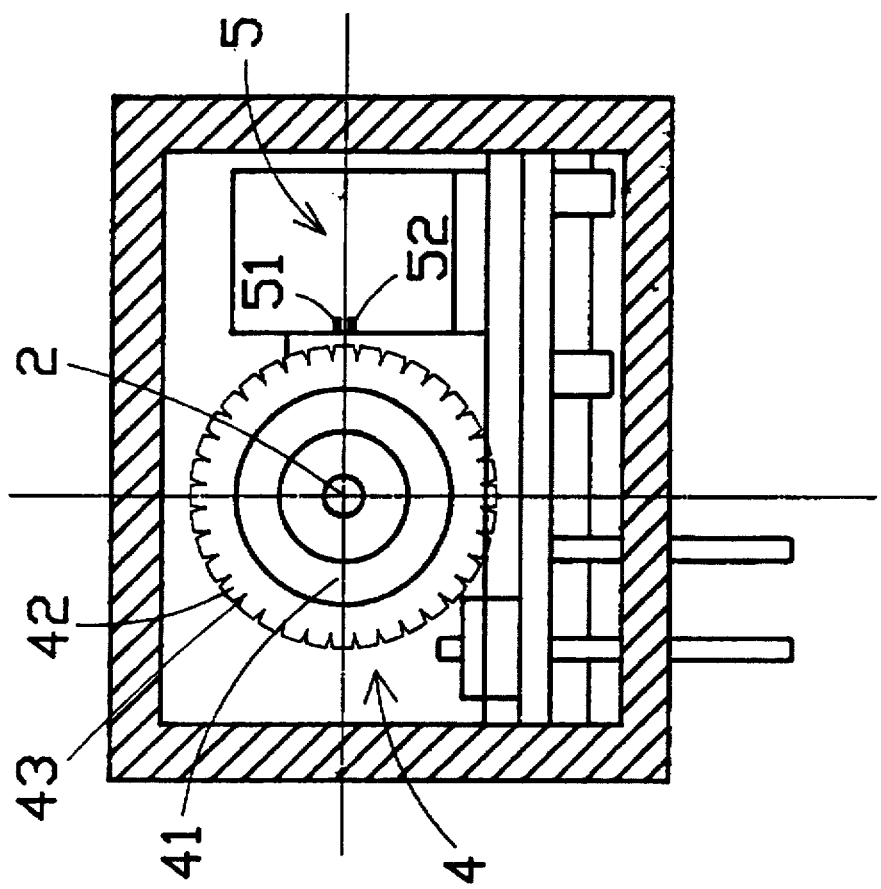
FIG. 3 is a rear side view in section of the digital signal output device shown in FIG. 2.

Referring to FIGS. 2 and 3, a digital signal output device in accordance with the present invention is generally comprised of a revolving shaft 2, a light source for example a light emitting diode 3, a transparent gear wheel 4, and a plurality of photo inductors for example photoelectric transistors 5. The light emitting diode 3 is disposed in front of the transparent gear wheel 4. The transparent gear wheel 4 is fixedly mounted around the revolving shaft 2, having a plurality of for example 36 teeth raised around the periphery and spaced from one another by gaps 43, and an annular sloping wall 41 at one side around the center. The photoelectric transistors 5 are arranged in parallel in the revolving direction of the transparent gear wheel 4 (see FIG. 3) and spaced from the light emitting diode 3 at a particular angle (see FIG. 2).

Figure 4:
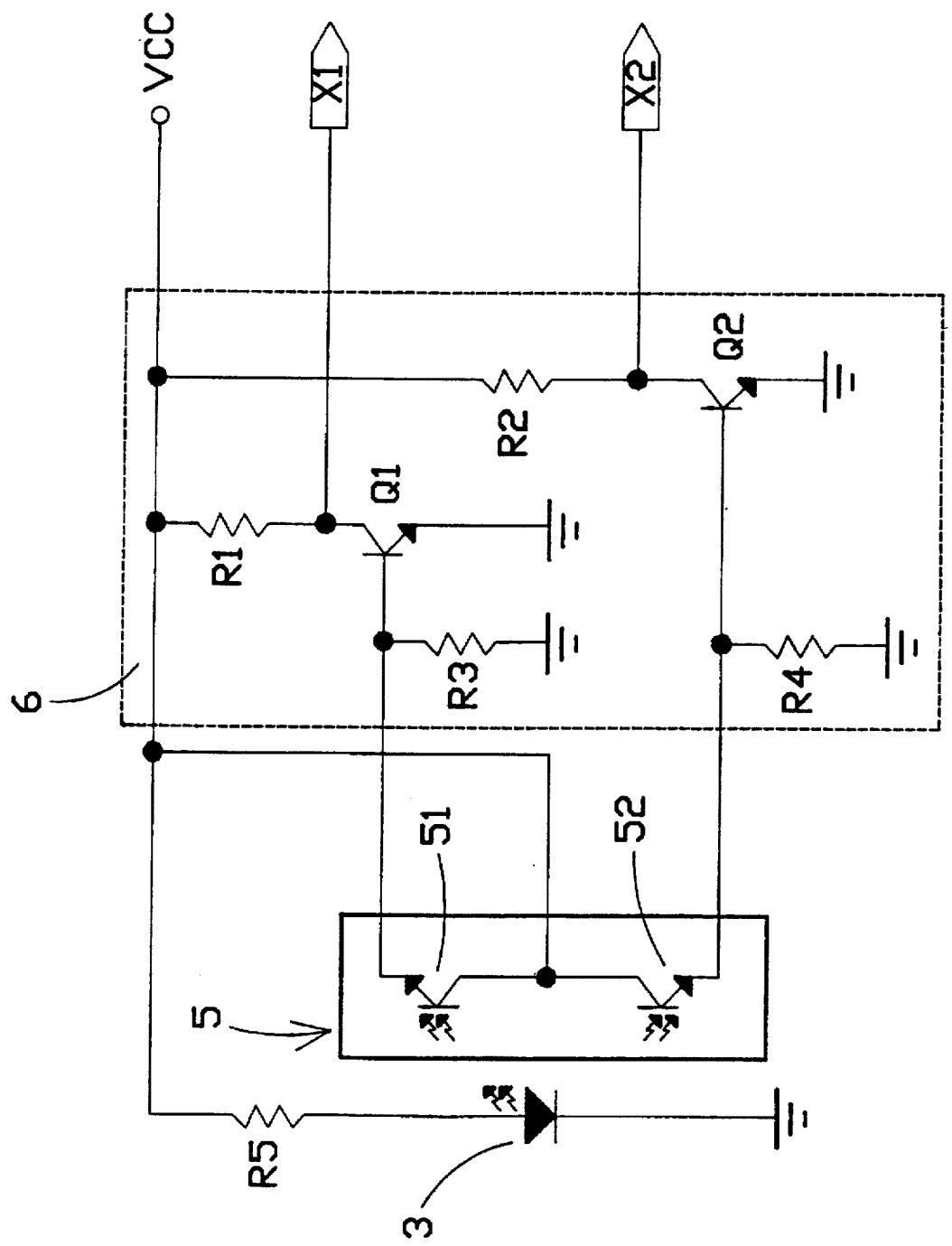
FIG. 4 is a circuit diagram of the present invention.

Referring to FIG. 4 and FIGS. 2 and 3 again, the light of the light emitting diode 3 is projected onto the sloping wall 41 of the transparent gear wheel 4 and reflected by it onto the photoelectric transistors 5. Because the teeth 42 and the gaps 43 have different light conductivity, the photoelectric transistors 5 are alternatively triggered to provide an electrical signal output during the rotation of the transparent gear wheel 4. The output ends of the photoelectric transistors 5 are respectively connected to the input end of an amplification circuit, and therefore a digital signal can thus be obtained from the output end of the amplification circuit.

Figure 5B:
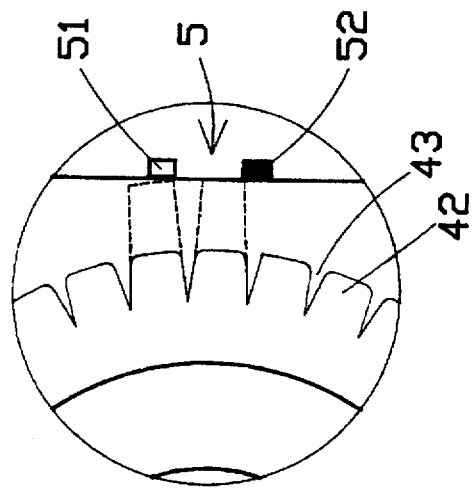
FIGS. 5A–5D show the relationship between the teeth and gaps of the transparent gear wheel and the photoelectric transistors.
Figure 5D:
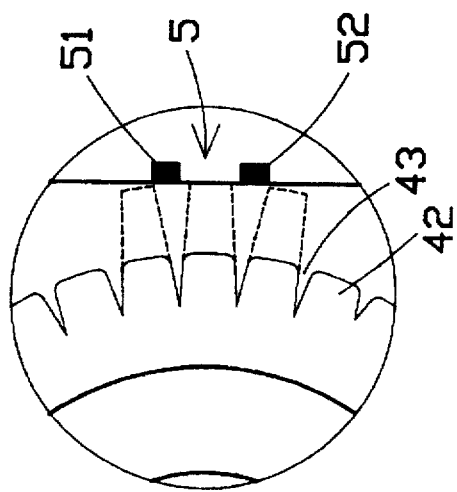
Figure 5A:
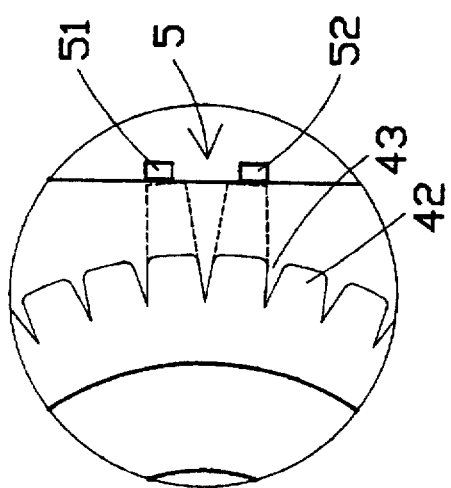
Figure 5C:
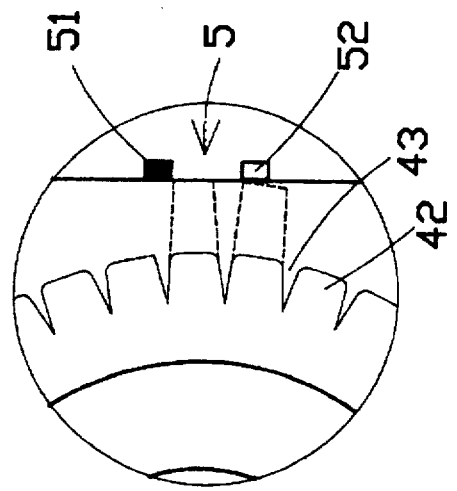

Referring to FIGS. 5A–5D when the transparent gear wheel 4 is rotated, the photoelectric transistors 5 are alternatively to produce output signals as follows (in the drawings, induced photoelectric transistors are indicated by white color, non-induced photoelectric transistors are indicated by black color): FIG. 5A depicts when two teeth 42 are respectively moved into alignment with the two photoelectric transistors 51, 52, the two photoelectric transistors 51, 52 are induced to provide an output signal (0,0) through the amplification circuit 6; FIG. 5B depicts when one tooth 52 and one gap 53 are moved into alignment with the upper photoelectric transistor 51 and the lower photoelectric transistor 52, the amplification circuit 6 is driven to produce an output signal (0,1); FIG. 5D depicts when two gaps 53 are moved into alignment with the upper photoelectric transistor 51 and the lower photoelectric transistor 52, the amplification circuit 6 is driven to produce an output signal (1,1); and FIG. 5C depicts when one gap 53 and one tooth 52 are moved into alignment with the upper photoelectric transistor 51 and the lower photoelectric transistor 52, the amplification circuit 6 is driven to produce an output signal (1,0).

Referring to FIG. 3 again, when the transparent gear wheel 4 is rotated counter-clockwise, the amplification circuit 6 is driven to,produce signals in the order of shown in FIGS. 5A, 5B, 5D and 5C; on the contrary, when the transparent gear wheel 4 is rotated clockwise, the amplification circuit 6 is driven to produce signals in the order shown in FIGS. 5C, 5D, 5B and 5A. The output signals from the amplification circuit 6 is then transmitted to a digital circuit. According to the order and number of the signals, the digital circuit can then accurately figure out the moving direction of the device and the amount of its movement.

The aforesaid revolving shaft 2 can be turned with the fingers or coupled to a miniature electrical rotary device. Therefore, the digital signal output device of the present invention can be used in a monitor for horizontal or vertical synchronizing control, or in an audio equipment for volume or base control. If the transparent gear wheel has for example 36 teeth and two photoelectric transistors are installed to match with the transparent gear wheel, there are total 144 signals produced when the transparent gear wheel is moved through one turn. Therefore, any movement of the device through a small angle can be accurately detected.

As indicated, the present invention provides a digital signal output device which uses photoelectric elements to accurately detect the moving direction of the wheel and its amount of movement.

It is to be understood that the drawings are designed for purposes of illustration only, and are not intended as a definition of the limits and scope of the invention disclosed.

What the invention claimed is:

1. A digital signal output device comprising a revolving shaft, a transparent gear wheel fixedly mounted around said revolving shaft and turned by the revolving shaft, said transparent gear wheel having a plurality of teeth alternatively spaced by gaps around the periphery and an annular sloping wall at one side around the center, and a plurality of photoelectric inductors spaced from the periphery of said transparent gear wheel and arranged in parallel, wherein when said transparent gear wheel is turned by said revolving shaft, the light from a light source is projected onto the sloping wall of said transparent gear wheel and reflected radially through the teeth and/or gaps of said transparent gear wheel onto said photoelectric inductors, causing said photoelectric inductors to be or not to be triggered.

2. The digital signal output device of claim 1 wherein said photoelectric inductors have a respective output respectively connected to an amplification circuit, causing said amplification circuit to provide a digital signal output.

3. The digital signal output device of claim 1 wherein said revolving shaft is coupled to a miniature electric rotary device and installed in a monitor for vertical or horizontal synchronizing control.

4. The digital signal output device of claim 1 wherein said revolving shaft is coupled to a miniature electric rotary device and installed in an audio equipment for volume or base control.

* * * * *